No. 616,941. Patented Jan. 3, 1899.
O. C. KNIPE.
BALL BEARING.
(Application filed Apr. 13, 1897.)

(No Model.)

Witnesses:
C. L. Belcher
Aliek G. Macandrew

Inventor
Oliver C. Knipe
By Ross H. Least,
his Attorney.

UNITED STATES PATENT OFFICE.

OLIVER C. KNIPE, OF NORRISTOWN, PENNSYLVANIA.

BALL-BEARING.

SPECIFICATION forming part of Letters Patent No. 616,941, dated January 3, 1899.

Application filed April 13, 1897. Serial No. 631,981. (No model.)

*To all whom it may concern:*

Be it known that I, OLIVER C. KNIPE, a citizen of the United States, and a resident of Norristown, county of Montgomery, State of Pennsylvania, have invented certain new and useful Improvements in Ball-Bearings, of which the following is a specification.

This invention relates to ball-bearings, the object being to make a device of this kind with a ball-retainer of simple construction which will permit the ball-race to be handled apart from the journal-box without liability of scattering the balls and yet will admit of removal and replacement of balls, if required.

My invention comprises a ball-bearing provided with an annular cavity to receive the balls and a separable washer or retaining device detachably locked to the race by a spring nesting between the washer and wall of the race.

The several features of novelty will be specifically indicated in the claims annexed to this specification.

Figure 1:
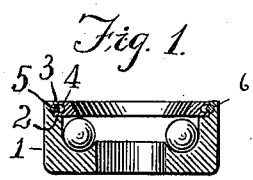
Figure 2:
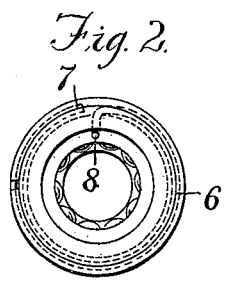
Figure 3:
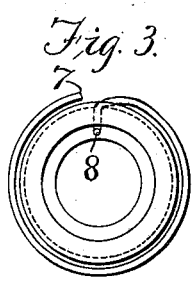
Figure 4:
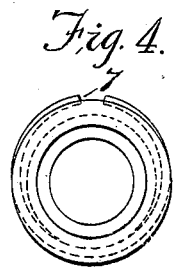

In the drawings which illustrate the invention, Figure 1 is a sectional view of a ball-bearing embodying my invention. Fig. 2 is a side elevation of the construction shown in Fig. 1. Fig. 3 is a view of the ball-retainer detached from its race, and Fig. 4 is a side elevation of a modification.

1 represents a ball-race, preferably made of hardened steel and provided with a cup-shaped annular cavity to receive a circle of balls. The wall of the race is provided with an annular shoulder 2, against which may be seated a ball-retaining washer 3. The washer is of such width as to form when in its seat a continuation of the ball-inclosure, the distance across the circular edges of the inclosure being less than the diameter of the balls, thus preventing escape of the latter when the bearing is handled apart from its journal. In the periphery of the washer is a groove 4 and in the wall of the race a coöperating groove 5, the two grooves forming a seat for a circular spring 6 to lock the parts together. The ring spring is preferably cut, as indicated at 7, Figs. 2, 3, and 4, and in the wall of the race is a slot or opening through which may be inserted a tool to force inwardly the end of the spring, the washer-groove being sufficiently deep to permit the spring to be forced in sufficiently far to clear the groove in the race. Thus by forcing inwardly the end or ends of the spring the washer may be removed from the race. In Figs. 2 and 3 one end of the spring is anchored in the washer, as shown at 8, leaving the other end free. Both ends may, however, be free, as shown in Fig. 4. In both forms of construction the spring is at all times connected to the washer or, if preferred, to the race, which would be an obvious modification, the advantage resulting that when the parts are separated the spring does not become a disconnected piece, liable to be misplaced or lost. Another resulting advantage is that there is great ease of assembling the parts. In the type shown in Fig. 4 the spring opens only enough to hold the washer and race together, and when the parts are separated the spring is still confined in the peripheral groove. The spring may be made of round, square, or flat wire, as desired.

In the drawings I have shown the retainer as a simple washer, and I prefer this construction; but obviously the form of lock I have shown would apply also to other forms of retainers, such as a cup inclosing the race and having an internal lip to act as a retainer.

Having thus described my invention, what I claim as new, and desire to secure by Letters Patent, is—

1. A retainer for ball-bearings comprising a body portion of a fixed diameter, and a separate elastic retaining ring or rim located radially outward beyond said body portion, and adapted to be engaged between said body portion and the wall of the bearing, and by its engagement prevent the movement of the retainer in either direction.

2. A ball-bearing comprising a ball-race having an annular cavity for the balls, a shoulder in the race-wall, a ball-retainer seated on said shoulder, and a locking-spring secured to and forming part of the retainer when removed, said spring being adapted to engage a groove in the race-wall.

3. A ball-bearing comprising a ball-race having an annular cavity for the balls, a ball-retainer, the retainer and race-walls having coöperating grooves, and a locking-spring adapted to seat in both grooves.

4. A ball-bearing comprising a ball-race having an annular cavity for the balls, and a groove in its wall, a ball-retainer having a coöperating peripheral groove, and a locking-spring adapted to nest in both grooves.

5. A ball-bearing comprising a ball-race having an annular cavity for the balls, and a groove in its wall, a ball-retainer having a coöperating peripheral groove, and a locking-spring secured to the retainer and of less depth than the retainer-groove and adapted to engage both grooves, an opening being provided to render the spring accessible for separating the parts.

6. A ball-bearing comprising a ball-race having an annular cavity for the balls, and a groove in the race-wall, a ball-retainer having a coöperating peripheral groove, a locking-spring having one end anchored in one of the parts and the other end free, one of the parts being provided with an opening to permit the spring to be disengaged for separation of the parts.

In testimony whereof I have hereunto subscribed my name this 6th day of April, A. D 1897.

OLIVER C. KNIPE.

Witnesses:
   IRVIN P. KNIPE,
   MARGARET RICHARDSON.